United States Patent [19]

Genelin

[11] Patent Number: 4,495,893

[45] Date of Patent: Jan. 29, 1985

[54] METHOD FOR ELICITING RESPONSES BY ANIMALS TO MOVING, VISUALLY DISCERNIBLE STIMULI, AND APPARATUS FOR PROVIDING A MOVING VISUALLY DISCERNIBLE STIMULUS

[76] Inventor: Gregory U. Genelin, 14788 Sky View Rd., Madera, Calif. 93638

[21] Appl. No.: 548,621

[22] Filed: Nov. 4, 1983

[51] Int. Cl.³ .............................................. A01K 15/02
[52] U.S. Cl. ...................................... 119/29; 273/369
[58] Field of Search ................... 119/29; 273/359, 366, 273/367, 369, 370

[56] References Cited

U.S. PATENT DOCUMENTS

| | | | |
|---|---|---|---|
| 2,793,038 | 5/1957 | Wallace et al. | 273/369 |
| 3,303,821 | 2/1967 | Harris | 119/29 |
| 3,324,832 | 6/1967 | McCain | 119/29 |
| 3,471,153 | 10/1969 | Baumler | 273/359 |

Primary Examiner—Hugh R. Chamblee
Attorney, Agent, or Firm—Huebner & Worrel

[57] ABSTRACT

A method for eliciting responses from animals to moving, visually discernible stimuli; and an apparatus for providing a moving visually discernible stimulus for eliciting responses from animals.

2 Claims, 3 Drawing Figures

METHOD FOR ELICITING RESPONSES BY ANIMALS TO MOVING, VISUALLY DISCERNIBLE STIMULI, AND APPARATUS FOR PROVIDING A MOVING VISUALLY DISCERNIBLE STIMULUS

BACKGROUND OF THE INVENTION

1. Field of the Invention

The present invention relates to a method for eliciting a response by an animal to a moving visual stimulus and more particularly to such a method adapted for use in training horses to respond to the unpredictable movements of cows and the like. The invention further relates to a device adapted for use in training horses to respond to the unpredictable movements of cows and the like.

2. Description of the Prior Art

The use of horses in cattle herding and related operations has long been known. Among the types of horses employed for such purposes are those known as "cutting horses".

From time to time, for a variety of reasons, it becomes necessary to remove one or more cows individually from a herd. For instance, it might be desirable to remove a cow which has suffered injury, disease, or the like. Further, a cow may need to be isolated temporarily or permanently from the herd, such as for branding, sale, or slaughter.

However, it has been found that a cow sought to be removed from a herd very often positions itself amid the other animals of the herd, due possibly either to coincidence or the cow's reaction to its inate sense that it is being sought. Thus, it is commonly observed that a single cow forced from the herd commonly will attempt to return to the apparent safety and protection afforded by a large group of cows standing or milling about together.

In a cutting operation, wherein a cow is removed individually from a group, a rider atop a cutting horse rides amongst the cows and locates a single cow desired to be isolated from the group. The cutting operation usually takes place in a corral or the like into which the cows have been herded. Upon location of the selected cow, the rider uses the horse to force the cow from the herd and move it toward an unoccupied, remote area of the corral. However, once the cow has successfully been forced from the herd, it commonly will attempt to evade the horse and rider and rejoin the herd. Such attempts are invariably accompanied by a series of unpredictable moves by the cow, including sudden starts and stops, seemingly instantaneous changes of direction, and other evasive tactics whereby the cow seeks to circumvent the horse and avoid being moved farther from the herd.

In order to prevent such a reunion by a cow and the herd from which it has most recently been separated, it is necessary that the horse and rider quickly react to any movement or sensation of movement by the cow in order to keep the horse positioned between the cow and the herd. Such reactions by the horse, it is believed, are due only in limited part to the horse's instincts. Thus, it has long been known that it is necessary to train the horse to respond to the visual stimulus provided by the intermittent and unpredictable movements of a cow that has been cut from a herd.

Various methods and apparatuses have been employed previously in an effort to train horses efficiently and effectively to assist the rider in the cutting operation and to react reflexively to the movements of cows being cut from the herd.

One such apparatus of which applicant is aware essentially consists of a simulated cow made of plastic or the like mounted on wheels powered by an electric motor, and in which or on which a human operator rides. The cow is controlled by the human operator who causes it to move back and forth in an effort to simulate the movements of an isolated cow. Such a device is relatively expensive and, therefore, is not generally available to trainers having limited budgets. Further, such a device is extremely large and cumbersome, and thus cannot be transported easily or conveniently from one training site to another site remote therefrom. Moreover, such a device must be operated by a person other than the rider of the horse to be trained. Thus, the movements of the device are not predictable by the rider of the horse to be trained and, therefore, the rider cannot anticipate the device's movements early in the horse's training period when assistance from the rider in directing a horse's movements is desirable.

A second form of apparatus is a simulated cow made of plastic or the like and which depends from a boom pivotable about an axis to permit movement of the artificial cow in a generally circular or arcuate path. Such movement is imparted to the plastic cow a person other than the rider of the horse. Consequently, the disadvantage of the rider's inability to predict the movement of the apparatus, alluded to above in connection with the motorized simulated device, is presented by this simulated cow apparatus as well.

Another form of device employed in training cutting horses comprises an endless rope looped about a pair of pulleys. One pulley generally consists of the rear wheel of a bicycle, the wheel being adapted to be driven by a pedaling motion imparted to the pedals of the bicycle. A flag or the like is attached to the rope and, upon pedaling of the bicycle pedals and concomitant movement back and forth of the rope, the flag moves back and forth to provide a visual stimulus to which the horse is desired to respond. As with the other devices discussed above, this device suffers the limitation of having to be operated by a person other than the rider of the horse. Further, because motion is imparted to the flag or target through human-powered means, the rate of speed is neither constant nor predictable by the rider of the horse.

A further disadvantage presented by many known training devices which are operated by other than the rider of the horse is that, often, the operator of the device must be paid to operate the device and, obviously, the potential for increasing the cost of training horses is accordingly present. Similarly, the training of a horse using a conventional device requires the presence of both the rider and a device operator; thus, the rider of the horse cannot train the horse without the assistance of another.

Prior to the introduction of training devices, the traditional method of training cutting horses involved the use of live cows, essentially reproducing the actual cutting operations and situations anticipated to be encountered by the horse being trained. However, many inexperienced horses, and in particular younger horses, have been known to become frightened or frustrated when first confronted with a group of cows or when encountering a single cow which has been used repeatedly as an unwilling training object and is evidencing an uncooperative attitude. The use of live cows also is burdened by the generally limited availability of cows for such purpose, particularly in situations in which the trainer of the horse is not also an owner of a herd of cows.

Thus, it has long been known that it would be desirable to have an improved method of training cutting horses to respond in desired fashion to the visual stimuli presented by animals having a tendency unpredictably to move and cease moving, wherein such method is capable of being performed by the trainer of a horse without assistance from another person.

Therefore, it has also long been known that it would be desirable to have an improved device for training cutting horses and the like to respond to the unpredictable movements of cows that is inexpensive and adapted for use and control by the rider of the horse. Further, it has long been known that it would be desirable to have such a device which is characterized by simplicity of construction and minimization of size to permit easy portability thereof from one training site to another. Also, it has long been known that it would be desirable to have such a device which is adapted to move a target, or other visual stimulus, at a variety of selected constant speeds to permit training of horses having differing levels of experience and ability.

OBJECTS AND SUMMARY OF THE INVENTION

It is therefore an object of the present invention to provide an improved method of eliciting responses from animals to the movement of a visual stimulus, and having particular utility in the training of such animals to so respond.

Another object is to provide such a method which is adapted for use in training horses to respond to intermittently moving visual stimuli, such as that presented by cows, having a tendency unpredictably to move and to cease movement, wherein such movement is adapted to be performed under the direct control of the rider of a horse being trained.

Another object is to provide such a method which is adapted for use in the training of horses and the like having different levels of experience and ability in responding to such unpredictably moving visual stimuli.

Another object is to provide such a method which is adapted for use in providing practice for horses previously trained to respond to the movement of such visual stimuli.

Another object is to provide such a method which is adapted to be used in the readying and warming up of horses prior to competition by the horses in the judged response to moving visual stimuli, such as cutting horse competitions.

Another object is to provide an improved apparatus for eliciting from cutting horses and other animals responses to the movement of a visual stimulus.

Another object is to provide such an apparatus which is adapted to provide a moving stimulus for eliciting desired responses from a horse.

Another object is to provide such an apparatus which is adapted to move a visual stimulus in the range of vision of a horse at a substantially constant speed determined by the rider of the horse.

Another object is to provide such an apparatus which is adapted to move a visual stimulus within the range of vision of a horse ridden by a rider and selectively to cease and resume such movement in selected directions at the election and under the control of the rider of the horse.

Another object is to provide such an apparatus which can be preprogrammed autonomously to move a target back and forth along a path unpredictably to provide a moving visual stimulus to which a horse is desired to respond.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENTS

Figure 1:
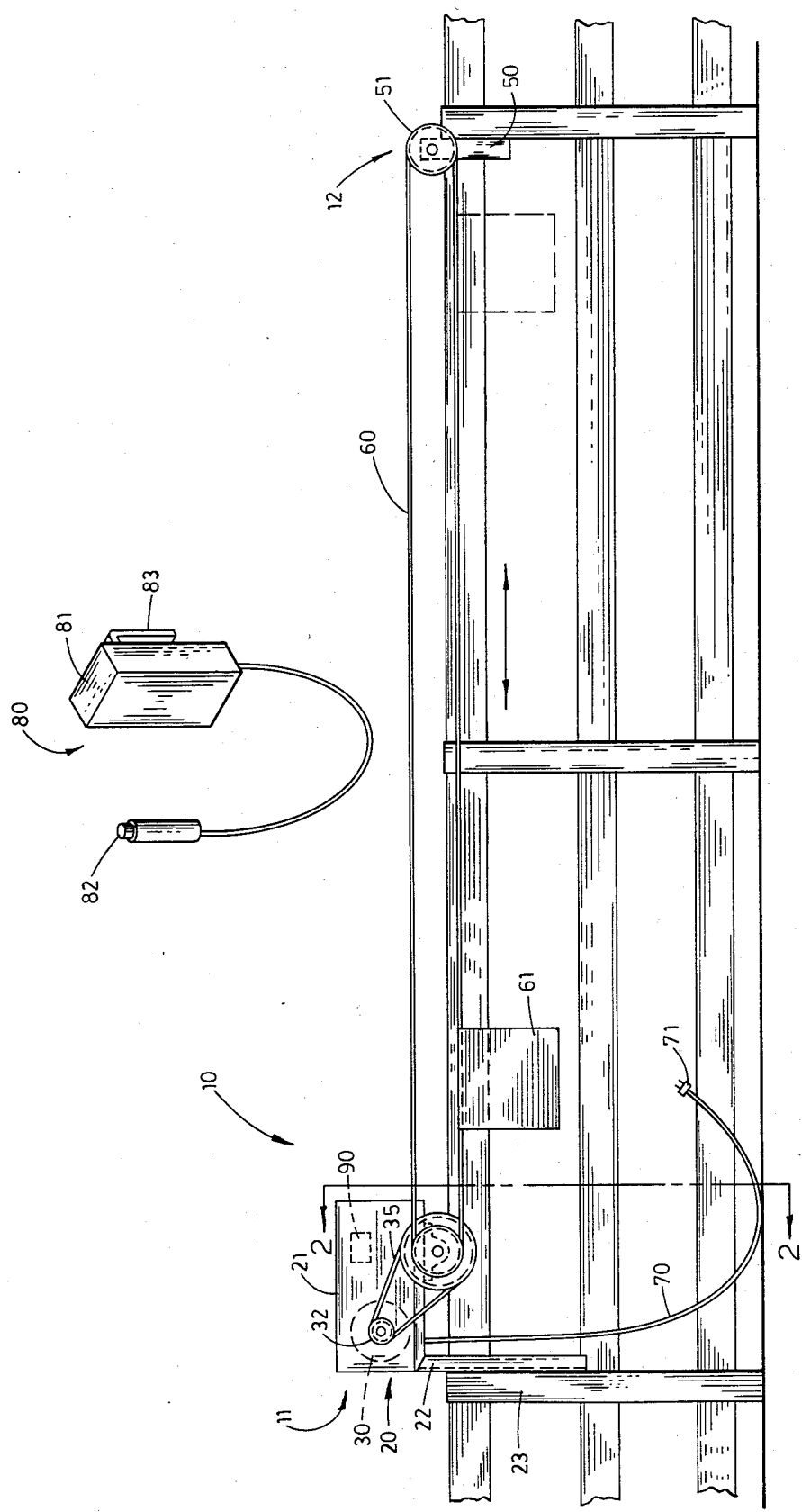
FIG. 1 is a front elevation of the apparatus of the present invention deployed in a typical operative environment, with a portion thereof enlarged for purposes of illustration.

I. Method For Eliciting Responses By Animals To Moving Visual Stimuli

The method of the present invention is adapted for use in the eliciting of predictable and desired responses by animals to the movement of a visual stimulus. The method has particular utility in the training of animals which are periodically exposed to various moving visual stimuli and by whom it is desirable that a selected form of response be exhibited. This, as described above, is especially true in the case of cutting horses and, therefore, for illustrative convenience, the method is described with particular reference thereto. However, it will become readily apparent that the method has application in the training or conditioning of a wide variety of other animals as well.

In performing the method of the present invention, a target or similar object visually discernible by a horse surmounted by a rider is disposed suspended above the ground within the range of vision of the horse. The target is initially caused to move at a substantially constant speed along a predetermined path, preferably laterally as viewed by the horse, whereby the horse is encouraged to respond to the movement thereof by similarly moving at a substantially similar pace as nearly as possibly simultaneously with the movement of the target. Further, it is preferable, though not necessary, that the target be moved along a substantially linear path. The target is then caused to cease movement for a selected period of time, either then being permitted temporarily to pause in a stopped attitude before resuming movement in the first direction or quickly to change direction and move in a course substantially 180° opposite to that in which it originally traveled. Such resumption of movement is performed to move the object a selected distance, although not necessarily a distance equivalent to the distance of the initial movement. Preferably, the steps of the method are then repetitively performed.

Employing the method of the present invention, the horse is thus encouraged to cease movement at the same time that the target is caused to cease, and to resume movement in the same direction and at the same pace as the target is subsequently caused to move.

It is preferable that the target be moved at a constant speed when movement is imparted thereto, and it is further preferable that such speed be adjusted in accordance with the experience and ability of the given horse. Thus, the method of the present invention can be performed at a slower pace in the early stages of the training of a given horse having little experience or ability, thereby preventing frustration of the horse and the inhibition of the horse's further progress in its training.

Further, it is preferable that the method of the present invention be under the control of the rider of the horse; that is, the speed of the movement of the target and the duration of movement in any given direction should be determined by the rider atop the horse as should the duration of each temporary cessation of movement. Thus, the rider, knowing in advance when the target will cease to move and resume movement, can urge the horse to stop movement or to resume movement in the direction in which the target is traveling, thereby helping to instill in the horse a sense of confidence and a substantially reflexive response to the varied movements of the target. Thus, when presented with a live animal whose lateral movements substantially resemble those of the target, such as a cow, the horse ideally will be preconditioned to respond appropriately to the animal's movements.

Of course, as the horse gains greater experience in responding to the movements of the target, and assimilates a reflexive knowledge of the desired form of response to the movement or cessation of movement of an object having a tendency unpredictably to move and cease moving, the method of the present invention can be performed in such a manner as to move the target at a faster relative speed and to alternate the directions of its movement more frequently. Thus, the horse can progressively be trained on a schedule that complements its metal and physical development as well as its ability to learn.

The method also finds application in the "warming up" of a horse prior to use of the horse in a cutting operation or the like. Still further, the method can be used to provide practice for a horse used in competitive cutting competitions.

Additionally, the method can be practiced to train other animals to respond to moving visual stimuli. For instance, herding dogs can be conditioned, using the method, to respond to the sometimes unpredictable movements of sheep, cattle, or the like.

II. Apparatus For Providing a Moving Visually Discernible Stimulus

Referring more particularly to the drawings, the training device embodying the principles of the present invention is designated generally by the numeral 10 in FIG. 1. As shown therein, the training device provides a motive assembly including a first, driving portion 11, and a second, driven portion 12 adapted to be connected in driven relation to the first portion.

The first portion provides a driving assembly 20 having a housing 21 mounted on a mounting plate 22. The mounting plate can be constructed in a variety of forms, as will hereinafter be explained in greater detail. In the preferred embodiment, the mounting plate can be directly fastened, as by bolts, nails, or the like, on a preexisting, substantially upright post 23 or the like, such as might be found spaced from similar posts in a corral or other fenced enclosure, or on an initially separate post adapted for substantially upright deployment.

Figure 2:
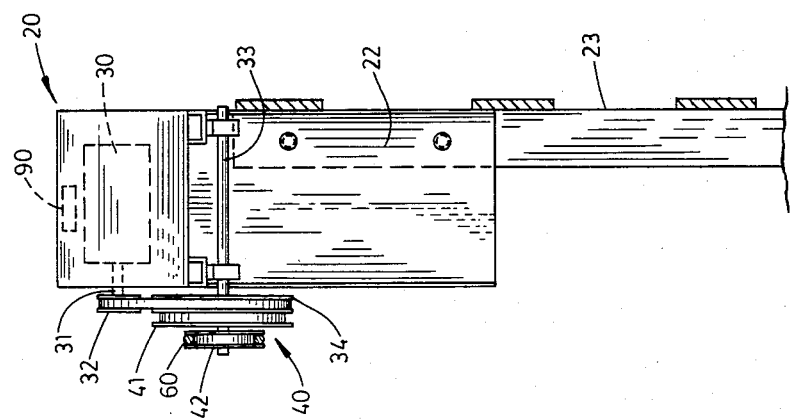
FIG. 2 is a sectional view taken on line 2—2 in FIG. 1.

Mounted within the housing 21 of the driving assembly 20 is a reversible electric motor 30, shown schematically in FIGS. 1 and 2. An axle 31 extends from the motor and is connected in driven relation thereto, as can best be seen in FIG. 2. The axle mounts a driving pulley 32 for rotation thereof about an axis. Mounted on the housing 21 is a second axle 33 spaced from the first axle 31 for rotation about an axis substantially parallel to that about which the first axle is adapted to rotate. The second axle 33 mounts a second, driven pulley 34 having a periphery concentric with the axis of rotation of the second axle and adapted to rotate therewith about a substantially common axis. The second pulley 34 is connected in driven relation to the first, driving pulley 32 by an endless belt 35 constructed of any suitable material and deployed in closely circumscribing relation thereabout.

The driving assembly 20 provides a tandem pulley assembly 40 providing a third, high-speed pulley 41 having a predetermined diameter and fixedly mounted on the second axle 33 for rotation therewith about the axis of rotation; and a fourth, low-speed pulley 42, also mounted on the second axle 33. The low-speed pulley has a predetermined diameter, preferably substantially less than that of the high-speed pulley 41, and rotates therewith about a common axis. While the preferred embodiment provides two pulleys in the pulley assembly, it will be recognized that a greater or lesser number is feasible as well.

The second portion 12 of the training device 10 provides a mounting member 50 on which a fifth pulley 51 is mounted for driven rotation about an axis. The mounting member 50 is adapted to be secured on an initially separate post, such as a substantially vertically disposed fence post, in an elevated attitude relative to the ground surface. The second portion 12 is adapted to be deployed in spaced relation a predetermined distance from the first portion in an operative attitude.

An endless cord, or target carrier, 60, constructed of nylon, hemp, or other suitable material, is provided and is adapted to be disposed in tensioned, closely circumscribing relation about the fifth pulley 51 and either the high-speed pulley 40 or the low-speed pulley 41, at the election of the operator of the training device 10. A target member 61 is borne on and depends from the cord 60. Preferably, the cord 60 is operatively disposed in a substantially horizontal attitude, whereby movement thereof back and forth will cause the target member 61 to be carried along a substantially horizontal path.

A conventional electrical cord 70 having a plug 71 is connected to the electric motor for delivery of electric current thereto from a conventional source of electricity into which the plug 71 is adapted to be inserted.

As shown in FIG. 1, a transmitter member 80 (shown enlarged for illustrative purposes) is provided having a body 81 and a switch 82. The transmitter is adapted to send a signal of predetermined frequency upon the triggering or depression of the switch 82 by an operator thereof. The transmitter member body 81 mounts a clip 83 or the like to enable attachment thereof to the belt or clothing of the operator, or to any convenient article. The transmitter member 80 is powered by conventional means, such as a nine-volt battery or the like. Further, the frequency of the signal emitted may be selected from any of a multitude of frequencies commonly generated by like transmitters.

A receiver unit 90, depicted schematically in FIG. 1, of conventional form and construction is mounted within the housing 21 of the driving assembly 20 and is adapted to receive signals transmitted from the transmitter member 80 when the transmitter member is remote therefrom. The receiver is connected to the electric motor through the circuitry thereof, as shown in FIG. 3, to trigger the operation thereof.

Figure 3:
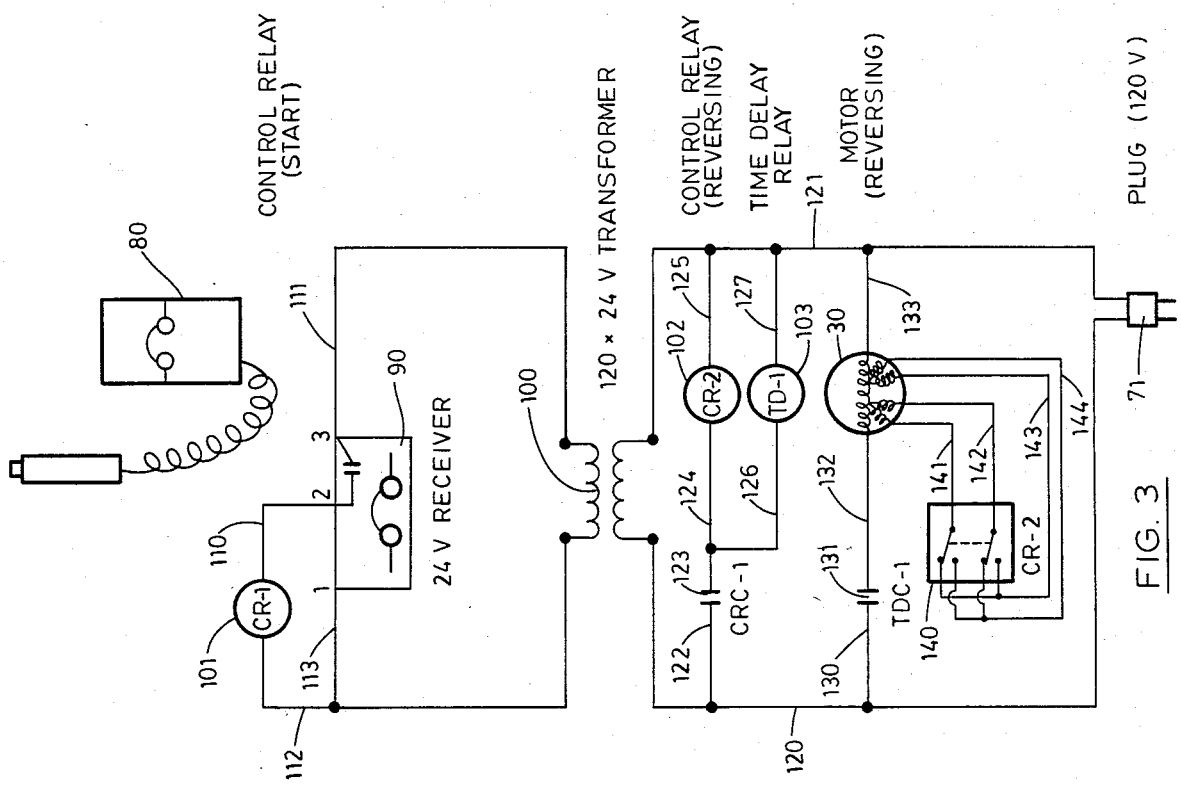
FIG. 3 is a circuit diagram of an electrical circuit adapted for use in the preferred embodiment of the apparatus of the present invention.

A representative schematic diagram of the circuitry of the first portion 11 of the apparatus 10 is shown in FIG. 3. The circuit depicted therein is substantially similar in construction and mode of operation to that utilized in a conventional, remotely-controlled garage door opening mechanism, but differs therefrom, in part, in providing a time delay mechanism, as will hereinafter be described in greater detail.

The circuit provides a plug 71 adapted for connection to a conventional 120 volt electrical source to energize the circuit. A transformer 100 is provided to step down the current powering the receiver unit 90 which, in the preferred embodiment, is a 24 volt receiver. A control relay 101, designated CR-1, is provided to cause the reversible motor 30 to commence operation in a predetermined rotational direction upon signalling thereof by the receiver unit 90. A reversing relay 102, designated CR-2, is provided to cause a reversal in the rotational direction of the reversible motor 30. A time delay relay 103, designated TD-1, is provided to cause a lag time or delay of predetermined duration between initiation of a signal to the receiver unit 90 and effectuation of the signal at the reversible motor 30. In the preferred embodiment, such a delay is approximately one-half second, although it will be appreciated that a delay greater or less than such a delay could be utilized.

An electrical conductor 110 connects the receiver unit 90 with the control relay 101. Electrical conductor 111 connects receiver unit 90 with the transformer 100. Electrical conductor 112 connects the control relay 101 with the transformer. Electrical conductor 113 connects the receiver unit 90 with electrical conductor 112.

Electrical conductor 120 connects the plug 71 with the transformer 100. Electrical conductor 121 connects the transformer 100 with the plug 71. Electrical conductor 122 connects electrical conductor 120 with control relay contact 123. Electrical conductor 124 connects control relay contacts 123 with reversing relay 102. Electrical conductor 125 connects reversing relay 102 with electrical conductor 121. Electrical conductor 126 connects electrical conductor 124 with time delay relay 103. Electrical conductor 127 connects time delay relay 103 with electrical conductor 121.

Electrical conductor 130 connects electrical conductor 120 with time delay contact 131. Electrical conductor 132 connects time delay contact 131 with the reversible motor 30. Electrical conductor 133 connects the reversible motor 30 with electrical conductor 121.

A two-position reversing relay switch 140 is provided, designated CR-2, and is connected to electrical conductor 132 by electrical conductors 141 and 142. Reversing relay switch 140 is connected to electrical conductor 133 by electrical conductors 143 and 144.

OPERATION

The operation of the apparatus of the present invention is believed readily apparent, and is briefly summarized at this point.

The apparatus 10 of the present invention finds particular utility in practicing the method of the present invention and can be used either to train a horse having little or no experience and previous training, or to exercise or "warm up" a horse previously trained.

In order to use the apparatus, it is first necessary to mount the first portion 11 and the second portion 12 in spaced relation. Preferably, although not necessarily, the first portion 11 is deployed first. The mounting plate 22 is affixed to an upstanding post 23, which may be a fence post or a post especially provided for mounting a plate thereon. The mounting plate can be fastened to the post by any suitable means.

The second portion 12 is then mounted a predetermined distance from the first portion 11. The mounting piece 50 of the second portion is attached to a preexisting fence post, or to a post or the like separately provided for such purpose. The second portion 12 is deployed in an elevated attitude relative to the ground or other surface to dispose the fifth pulley 51 a distance above the ground or other surface substantially equivalent to that by which the low-speed pulley 42 of the first portion 11 is elevated above the surface.

The cord 60 is then looped about the periphery of the fifth pulley 51 and either the high-speed pulley 41 or the low-speed pulley 42 depending upon the speed of movement desired. The target member 61 is then permitted to depend from the target-carrying cord 60. Deployment of the fifth pulley 51 and the low-speed pulley 42 in a substantially equivalent elevated posture results in the target-carrying cord being deployed in a substantially horizontal attitude relative to the ground, whereby the target member 61 is carried along a substantially linear, horizontal path upon operation of the apparatus.

The plug 71 is inserted into a conventional electrical outlet, and the apparatus 10 is ready to be used. At this time, the horse, surmounted by a rider, may be caused to approach the vicinity of the training device 10 to position the horse to bring the target member 61 within the horse's field of vision.

The rider attaches the signalling device on a portion of his clothing, such as his belt, shirt pocket, or the like; or the signalling device can be attached to the saddle of the horse. Thd switch 82 is grasped by the rider in a manner to permit depression thereof by the rider to cause the transmitter member 80 to generate signals.

The target member 61 is caused to move by initially depressing the switch 82 of the transmitter member 80 thereby causing the signal to be transmitted to the receiver 90. The receiver signals the electric motor 30 to cause the first axle 31 to rotate thereby driving the second axle and causing the high-speed pulley 41 or low-speed pulley 42, depending upon which pulley is engaged by the belt 35, to move the cord 60 in a predetermined direction at a substantially constant speed. Such movement is continued as long as the switch is held in a depressed attitude at the election of the rider.

Upon cessation of operation of the motor, a subsequent depression of the switch 82 signals the motor to reverse and rotate in a direction opposite to that which it was moving during the next preceding depression of the trigger. Thus, the target member 61 is enabled to be moved selectively in alternating directions, as desired.

An important feature of the training device 10 permits the operator thereof to cause the target member 61 to be carried in a given direction and to stop and subsequently to resume movement in the same direction without causing the target to reverse direction. This is accomplished by depressing the switch 82 and holding it in a depressed attitude for a desired length of time, during which the target member will be carried in a predetermined direction. The switch is then released and, within a predetermined time period, preferably less than one-half of a second, re-depressed. The switch 82 is then released a second time and quickly, within a period of one-half second, depressed once more. This causes an override or countermanding of the initial signal which would otherwise effect a reversal in direction of travel of the target member. Instead, the time-delay relay coil 103 permits a second signal to be interposed between the sending of the signal to reverse the movement of the target member and the receipt by that signal by the reversible motor.

Thus, in the above-described sequence, the target member will first move for a desired period of time in a given direction; then the target member will cease movement for a brief period of time and resume movement in the same direction in which it had traveled prior to this pause.

The importance of this feature is readily appreciated in situations in which the horse being trained begins to assume that any cessation of movement of the target member will routinely be followed by a reversal of the direction of movement. Thus, the horse can be trained away from complacently believing that an object will regularly move in a predictable manner and the training session using the apparatus 10 can involve myriad sequences of movements without becoming repetitious.

The training device of the present invention can be constructed in other forms as well to permit use thereof in different manners and for varied purposes.

A possible modification of the apparatus 10 is the provision of other than a linear path to be followed by the target member 61. This can easily be accomplished by providing additional pulleys or the like deployed intermediate the first portion 11 and the second portion 12 to define a substantially curved or arched path. Thus, the target member 61 could be caused to travel a course simulating forwardly and rearwardly, as well as lateral, movement by an animal such as a cow or the like.

Yet another manner in which the apparatus 10 could be modified within the spirit of the present invention, would be to mount the housing 21 of the first portion 11 for pivotal movement about a substantially vertical axis when the first portion 11 is operatively deployed. Therefore, the first portion 11 could be permanently mounted on a fence post or the like on the perimeter of a fenced enclosure, and could be swung or pivoted to a second, stored position away from the interior of the enclosure when not in use, thereby preventing damage thereto from occasional and accidental contact by animals moving within the enclosure.

Therefore, it is believed that the method and apparatus of the present invention provide a combination of simplicity, usefulness and consistency of performance heretofore absent in the prior art. The method and apparatus are sufficiently versatile to find utility in myriad applications.

Although the invention has been shown and described in what is conceived to be the most practical and preferred method and apparatus, it is recognized that departures may be made therefrom within the scope of the invention, which is not to be limited to the illustrative details disclosed.

Having described my method and apparatus, what I claim as new and desire to secure by Letters Patent is:

1. An apparatus for providing a stimulus visually discernible by a horse surmounted by a rider, the movement and cessation of movement of the stimulus being adapted to elicit responses from a horse, the apparatus comprising:
   a first pulley assembly adapted to be deployed in an elevated attitude and providing at least one pulley mounted for rotation about an axis of rotation;
   a second pulley assembly adapted to be deployed remotely from the first pulley assembly and providing at least one pulley mounted for rotation about an axis of rotation;
   a endless cord adapted to be supported on a pulley of the first pulley assembly and a pulley of the second pulley assembly for movement of the cord upon rotation of the pulleys;
   a visually discernible target carried by the cord for movement therewith;
   a motor connected in driving relation to the first pulley assembly and operable to impart rotation to the pulley thereof on which the cord is supported, the motor being selectively operable to cause the cord to move the target in a predetermined first direction and to cease such movement after the target has been moved a selected distance, and subsequently to cause the cord to move the target in a second, opposite direction, the motor further being selectively operable to cause the cord to resume moving in the first direction after such cessation of movent without movement in the second direction;
   signal means operable by the rider of the horse for causing the motor to drive the pulley assembly to move the target in a selected direction; and
   a housing bearing the motor and first pulley assembly and adapted to be mounted on an upright support for pivotal movement about a substantially vertical axis between a first position wherein the motor is deployed in an operative attitude and a second, stored position when the apparatus is not in use.

2. The apparatus of claim 1 wherein the signal means includes a receiver adapted to receive signals from a remote transmitter, the receiver being linked in controlling relation to the motor to cause the motor to impart rotation to the pulley; and a transmitter member adapted to be carried by the rider of the horse and providing a single switch selectively actuable by the rider to cause the target to move in the first and second directions and to cease moving.

* * * * *

UNITED STATES PATENT AND TRADEMARK OFFICE
CERTIFICATE OF CORRECTION

PATENT NO. : 4,495,893
DATED : January 29, 1985
INVENTOR(S) : Gregory U. Genelin It is certified that error appears in the above—identified patent and that said Letters Patent are hereby corrected as shown below:

Column 5, line 41, change "metal" to ---mental---.

Column 8, line 49, change "Thd" to ---The---.

Signed and Sealed this

Eighteenth Day of June 1985

[SEAL]

Attest:

DONALD J. QUIGG

Attesting Officer     Acting Commissioner of Patents and Trademarks